United States Patent
Badiru et al.

(10) Patent No.: US 12,522,279 B2
(45) Date of Patent: Jan. 13, 2026

(54) MITIGATION OF TRACTION STEER DISTURBANCE FROM DRIVER FEEDBACK TORQUE IN STEER-BY-WIRE VEHICLES

(71) Applicant: GM GLOBAL TECHNOLOGY OPERATIONS LLC, Detroit, MI (US)

(72) Inventors: Ibrahim A. Badiru, Novi, MI (US); Gabriel de Paula Eduardo, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 18/436,710

(22) Filed: Feb. 8, 2024

(65) Prior Publication Data
US 2025/0256763 A1 Aug. 14, 2025

(51) Int. Cl.
*B62D 5/04* (2006.01)

(52) U.S. Cl.
CPC ......... *B62D 5/0463* (2013.01); *B62D 5/0484* (2013.01)

(58) Field of Classification Search
CPC ............................ B62D 5/0463; B62D 5/0484
USPC .......................................... 701/41, 42, 43, 44
See application file for complete search history.

(56) References Cited

U.S. PATENT DOCUMENTS

| 8,626,393 B2 * | 1/2014 | Strecker | B62D 5/0466 |
| | | | 180/440 |
| 10,155,534 B2 * | 12/2018 | Varunjikar | B62D 5/0481 |

FOREIGN PATENT DOCUMENTS

| DE | 10200604088 A1 | 4/2008 | |
| DE | 102008042666 A1 | 5/2010 | |
| DE | 102014218509 A1 | 3/2015 | |
| DE | 102020108132 A1 | 10/2020 | |
| JP | 2004510637 A * | 4/2004 | ............... B60K 3/00 |

* cited by examiner

*Primary Examiner* — Hai H Huynh
(74) *Attorney, Agent, or Firm* — Ingrassia Fisher & Lorenz, LLP | IF&L

(57) ABSTRACT

In an exemplary embodiment, a system is provided that includes one or more sensors and one or more processors of a vehicle having a steering system. The one or more sensors are configured to obtain sensor data as to the vehicle. The one or more processors are coupled to the one or more sensors, and are configured to at least facilitate determining a likelihood of a traction steering disturbance occurring for the vehicle; and selectively adjusting resistance for a steering wheel of the steering system, in accordance with instructions that are provided via the one or more processors and that are executed via a motor that is coupled to the steering wheel.

20 Claims, 2 Drawing Sheets

MITIGATION OF TRACTION STEER DISTURBANCE FROM DRIVER FEEDBACK TORQUE IN STEER-BY-WIRE VEHICLES

INTRODUCTION

The technical field generally relates to vehicles and, more specifically, to methods and systems for controlling driver feedback torque in steering systems of vehicles.

Many vehicles today are steer-by-wire vehicles, in which a steering wheel of the vehicle is not physically connected to the wheels of the vehicle. In such vehicles, resistance may be provided for the driver via the steering wheel. However, in certain circumstances, the resistance may be affected by traction steer disturbances from driver feedback torque.

Accordingly, it is desirable to provide improved methods and systems for controlling traction steer disturbances in vehicles, such as in steer-by-wire vehicles. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is disclosed that includes obtaining sensor data from one or more sensors of a vehicle having a steering system; determining, via one or more processors of the vehicle, a likelihood of a traction steering disturbance occurring for the vehicle; and selectively adjusting resistance for a steering wheel of the steering system, in accordance with instructions that are provided via the one or more processors and that are executed via a motor that is coupled to the steering wheel.

Also in an exemplary embodiment, the step of determining the likelihood of a traction steering disturbance occurring includes generating, via the one or more processors, scalar values for each of a plurality of parameter values from the sensor data, wherein each of the scalar values represents a respective likelihood that a respective one of the plurality of parameter values is likely to contribute to a traction steering disturbance; aggregating, via the one or more processors, the scalar values for each of the plurality of parameter values; and calculating, via the one or more processors, an aggregate measure as to the likelihood of a traction steering disturbance occurring for the vehicle, based on the aggregating of the scalar values.

Also in an exemplary embodiment, each of the scalar values has a value that is between zero and one.

Also in an exemplary embodiment, the step of aggregating the scalar values includes multiplying, via the one or more processors, the scalar values for each of the plurality of parameter values.

Also in an exemplary embodiment, the method further includes obtaining, from the sensor data, a measured steering rack load for the steering system; determining, via the one or more processors, a corrected steering rack load that is attributable to the traction steering disturbance; and determining, via the one or more processors, an adjustment to the resistance based on the corrected steering rack load; wherein the step of selectively adjusting the resistance includes implementing the adjustment via the motor that is coupled to the steering wheel in accordance with the instructions that are provided via the one or more processors.

Also in an exemplary embodiment, the method further includes determining, via the one or more processors, a traction steer induced rack force estimate, based on the measured steering rack load and the likelihood of a traction steering disturbance occurring for the vehicle; wherein the determining of the corrected steering rack load is made using the traction steer induced rack force estimate.

Also in an exemplary embodiment, the method further includes applying, via the one or more processors, filtering based on a frequency mapping using the measured steering rack load and the likelihood of a traction steering disturbance occurring for the vehicle; wherein the determining of the corrected steering rack load is made using both the traction steer induced rack force estimate and the filtering based on the frequency mapping.

In another exemplary embodiment, a system is provided that includes one or more sensors and one or more processors of a vehicle having a steering system. The one or more sensors are configured to obtain sensor data as to the vehicle. The one or more processors are coupled to the one or more sensors, and are configured to at least facilitate determining a likelihood of a traction steering disturbance occurring for the vehicle; and selectively adjusting resistance for a steering wheel of the steering system, in accordance with instructions that are provided via the one or more processors and that are executed via a motor that is coupled to the steering wheel.

Also in an exemplary embodiment, the one or more processors are configured to at least facilitate generating scalar values for each of a plurality of parameter values from the sensor data, wherein each of the scalar values represents a respective likelihood that a respective one of the plurality of parameter values is likely to contribute to a traction steering disturbance; aggregating the scalar values for each of the plurality of parameter values; and calculating an aggregate measure as to the likelihood of a traction steering disturbance occurring for the vehicle, based on the aggregating of the scalar values.

Also in an exemplary embodiment, each of the scalar values has a value that is between zero and one.

Also in an exemplary embodiment, the one or more processors are configured to at least facilitate aggregating the scalar values by multiplying the scalar values for each of the plurality of parameter values.

Also in an exemplary embodiment, the one or more processors are configured to at least facilitate obtaining, from the sensor data, a measured steering rack load for the steering system; determining a corrected steering rack load that is attributable to the traction steering disturbance; determining an adjustment to the resistance based on the corrected steering rack load; and selectively adjusting the resistance by implementing the adjustment via the motor that is coupled to the steering wheel in accordance with the instructions that are provided via the one or more processors.

Also in an exemplary embodiment, the one or more processors are configured to at least facilitate determining a traction steer induced rack force estimate, based on the measured steering rack load and the likelihood of a traction steering disturbance occurring for the vehicle; and determining the corrected steering rack load using the traction steer induced rack force estimate.

Also in an exemplary embodiment, the one or more processors are further configured to at least facilitate applying filtering based on a frequency mapping using the measured steering rack load and the likelihood of a traction steering disturbance occurring for the vehicle; and determining the corrected steering rack load using both the traction steer induced rack force estimate and the filtering based on the frequency mapping.

In another exemplary embodiment, a vehicle is provided that includes a steering system, one or more sensors, and one or more processors. The steering system has a steering wheel and a motor coupled thereto. The one or more sensors are configured to obtain sensor data as to the vehicle. The one or more processors are coupled to the one or more sensors, and are configured to at least facilitate determining a likelihood of a traction steering disturbance occurring for the vehicle; and selectively adjusting resistance for the steering wheel, in accordance with instructions that are provided via the one or more processors and that are executed via the motor that is coupled to the steering wheel.

Also in an exemplary embodiment, the one or more processors are configured to at least facilitate generating scalar values for each of a plurality of parameter values from the sensor data, wherein each of the scalar values represents a respective likelihood that a respective one of the plurality of parameter values is likely to contribute to a traction steering disturbance; aggregating the scalar values for each of the plurality of parameter values; and calculating an aggregate measure as to the likelihood of a traction steering disturbance occurring for the vehicle, based on the aggregating of the scalar values.

Also in an exemplary embodiment, each of the scalar values has a value that is between zero and one; and the one or more processors are configured to at least facilitate aggregating the scalar values by multiplying the scalar values for each of the plurality of parameter values.

Also in an exemplary embodiment, the steering system further includes a steering rack, and the one or more processors are configured to at least facilitate obtaining, from the sensor data, a measured steering rack load for the steering rack; determining a corrected steering rack load that is attributable to the traction steering disturbance; determining an adjustment to the resistance based on the corrected steering rack load; and selectively adjusting the resistance by implementing the adjustment via the motor that is coupled to the steering wheel in accordance with the instructions that are provided via the one or more processors.

Also in an exemplary embodiment, the one or more processors are configured to at least facilitate determining a traction steer induced rack force estimate, based on the measured steering rack load and the likelihood of a traction steering disturbance occurring for the vehicle; and determining the corrected steering rack load using the traction steer induced rack force estimate.

Also in an exemplary embodiment, the one or more processors are further configured to at least facilitate applying filtering based on a frequency mapping using the measured steering rack load and the likelihood of a traction steering disturbance occurring for the vehicle; and determining the corrected steering rack load using both the traction steer induced rack force estimate and the filtering based on the frequency mapping.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
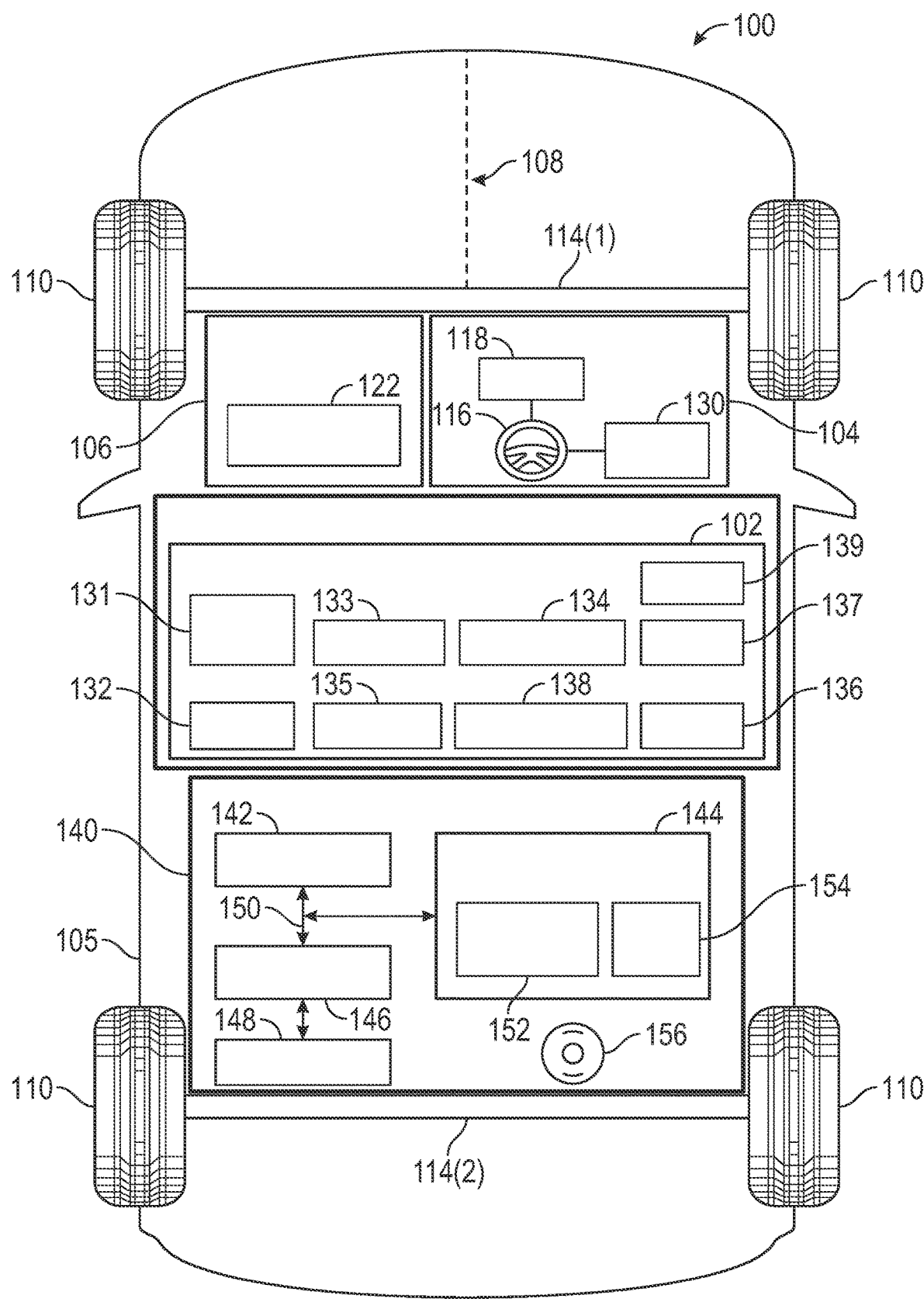
FIG. 1 is a functional block diagram of a vehicle that includes a steering system and a control system for controlling the steering system, and that mitigation of traction steer disturbances in the vehicle, in accordance with exemplary embodiment.

FIG. 1 illustrates a vehicle 100, according to an exemplary embodiment. As described in greater detail further below, the vehicle 100 includes a steering system 104, with the vehicle 100 also having a control system 102 for controlling mitigation of traction steer disturbances in the steering system 104 that result from driver feedback in operating the vehicle 100, as described in greater detail further below in connection with the vehicle 100 of FIG. 1 as well as the process 200 of FIG. 2.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform). In various embodiments, the vehicle 100 comprises a steer-by-wire vehicle.

The vehicle 100 includes a body 105 that is arranged on a chassis 108. The body 105 substantially encloses other components of the vehicle 100. The body 105 and the chassis 108 may jointly form a frame. The vehicle 100 also includes a plurality of wheels 110. The wheels 110 are each rotationally coupled to the chassis 108 near a respective corner of the body 105 to facilitate movement of the vehicle 100. In one embodiment, the vehicle 100 includes four wheels 110, although this may vary in other embodiments (for example for trucks and certain other vehicles).

A drive system 106 is mounted on the chassis 108, and drives the wheels 110, for example via axles 114. In various embodiments, the drive system 106 comprises a propulsion system that includes a motor 122 (e.g., an internal combustion engine and/or an electric motor/generator, coupled with a transmission thereof). In certain embodiments, the drive system 106 includes or is coupled to an accelerator pedal that receives inputs from a driver of the vehicle 100. In the depicted embodiment, the axles 114 include a front axle 114(1) and a rear axle 114(2).

In various embodiments, the steering system 104 provides steering for the vehicle 100. As depicted in FIG. 1, in various embodiments, the steering system 104 includes a steering wheel 116, a rack system 118, and a motor 120. In various embodiments, a driver of the vehicle 100 controls steering via the steering wheel 116. Also in various embodiments, inputs from the driver's engagement of the steering wheel 116 are utilized by the rack system 118 in turning the wheels 110 of the vehicle 100 to provide steering. In certain embodiments, the rack system 118 comprises a rack and pinion steering system. In addition, as mentioned above, in various embodiments, the steering system 104 comprises a steer-by-wire system, in which the steering wheel 116 is not physically connected to the wheels 110.

Also as depicted in FIG. 1, in various embodiments the steering system 104 also includes a motor 120 that is coupled to the steering wheel 116. In various embodiments, the motor 120 is utilized to provide and adjust resistance for the steering wheel 116, for example such that the steering wheel 116 performs and feels as expected for the driver. In various embodiments, the motor 120 is utilized for controlling mitigation of traction steer disturbances to the steering wheel 116 from driver feedback, in accordance with instructions provided by the control system 102 (described below).

With continued reference to FIG. 1, in various embodiments the control system 102 controls operation of the steering system 104. Specifically, in various embodiments, the control system 102 controls operation of the rack system 118, including in implemented user inputs provided via the steering wheel 116 for steering of the vehicle 100. Also in various embodiments, as noted above, the control system 102 controls mitigation of traction steer disturbances to the steering wheel 116 from driver feedback, including as described in greater detail further below in connection with the process 200 of FIG. 2.

As depicted in FIG. 1, in various embodiments, the control system 102 includes a sensor array 130 and a controller 140, as described in greater detail below in accordance with an exemplary embodiment.

In various embodiments, the sensor array 130 collects data pertaining to the vehicle 100 and its components, including for detecting conditions that relate to a likelihood that traction steer disturbances may be occurring with respect to the steering wheel 116. In various embodiments, the sensor data from the sensor array 130 is provided to the controller 140 for use in mitigating the traction steer disturbances, for example as described in greater detail further below.

In various embodiments, the sensor array 130 includes one or more rack load sensors 131, torque sensors 132, rotation sensors 133, suspension sensors 134, speed sensors 135, throttle sensors 136, steering wheel sensors 137, and friction sensors 138. In certain embodiments, the sensor array 130 may also include one or more input sensors 139.

In various embodiments, the rack load sensors 131 measure a load on the rack system 118 of FIG. 1.

Also in various embodiments, the torque sensors 132 measure one or more torque values for the vehicle 100, including a propulsion torque for the front axle 114(1) of the vehicle 100 in certain embodiments.

In various embodiments, the rotation sensors 133 measure a rotational speed of one or more wheels 110 of the vehicle 100, including one or more front wheels 110 thereof.

In various embodiments, the suspension sensors 134 comprise one or more suspension and/or pitch angle sensors that obtain sensor data as to a pitch angle of the vehicle 100 and/or one or more other parameters pertaining to a suspension system of the vehicle 100.

In addition, in various embodiments, the speed sensors 135 measure a speed of the vehicle 100 and/or information used to determine the vehicle speed (e.g., in certain embodiments, the speed sensors 135 may comprise wheel speed sensors 135 that measure wheel speed of the vehicle 100).

In various embodiments, the throttle sensors 136 measure or detect a position of a throttle of the vehicle 100 (e.g., of the propulsion system 106).

In various embodiments, the steering wheel sensors 137 obtain sensor data as to the steering wheel 116 of the vehicle 100, including as to an angle and a velocity of the steering wheel 116.

Also in certain embodiments, the friction sensors 138 comprise one or more sensors that measure or detect sensor data that pertains to and/or that can be used to calculate a road friction coefficient for a road or path on which the vehicle 100 is travelling.

In various embodiments, the input sensors 139 include one or more sensors that measure or detect inputs provided by a driver of the vehicle 100. In various embodiments, the input sensors 139 are coupled to a steering wheel, accelerator pedal, brake pedal, and other instruments of the vehicle 100, and are configured to measure or detect the driver's engagement thereof.

In various embodiments, the controller 140 is coupled to the sensor array 130 and receives sensor data therefrom. In various embodiments, the controller 140 is further coupled to the steering system 104, and in certain embodiments one or more of (and, in certain embodiments, to the drive system 106 and/or other systems of the vehicle 100). In various embodiments, the controller 140 controls the steering system 104 (including mitigation of traction steer disturbances) based on sensor data, including as described further below in connection with the process 200 of FIG. 2.

In various embodiments, the controller 140 comprises a computer system (also referred to herein as computer system 140). In various embodiments, the controller 140 (and, in certain embodiments, the control system 102 itself) is disposed within the body 105 of the vehicle 100. In one embodiment, the control system 102 is mounted on the chassis 108. In certain embodiments, the controller 140 and/or control system 102 and/or one or more components thereof may be disposed outside the body 105, for example on a remote server, in the cloud, or the like.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and described further below in connection therewith.

The memory 144 can be any type of suitable memory, including various types of non-transitory computer readable storage medium. In certain examples, the memory 144 is located on and/or co-located on the same computer chip as the processor 142. In the depicted embodiment, the memory 144 stores the above-referenced program 152 along with stored values 154 (e.g., look-up tables, thresholds, and/or other values with respect to traction steer disturbances and their relationship pertaining to the sensor data).

The interface 146 allows communication to the computer system of the controller 140, for example from a system driver and/or another computer system, and can be implemented using any suitable method and apparatus. In one embodiment, the interface 146 obtains the various data from the sensor array 130, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and described further below in connection therewith. In another exemplary embodiment, the program product may be directly stored in and/or otherwise accessed by the memory 144 and/or a disk (e.g., disk 156), such as that referenced below.

The bus 150 serves to transmit programs, data, status and other information or signals between the various components of the computer system of the controller 140. The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program.

Figure 2:
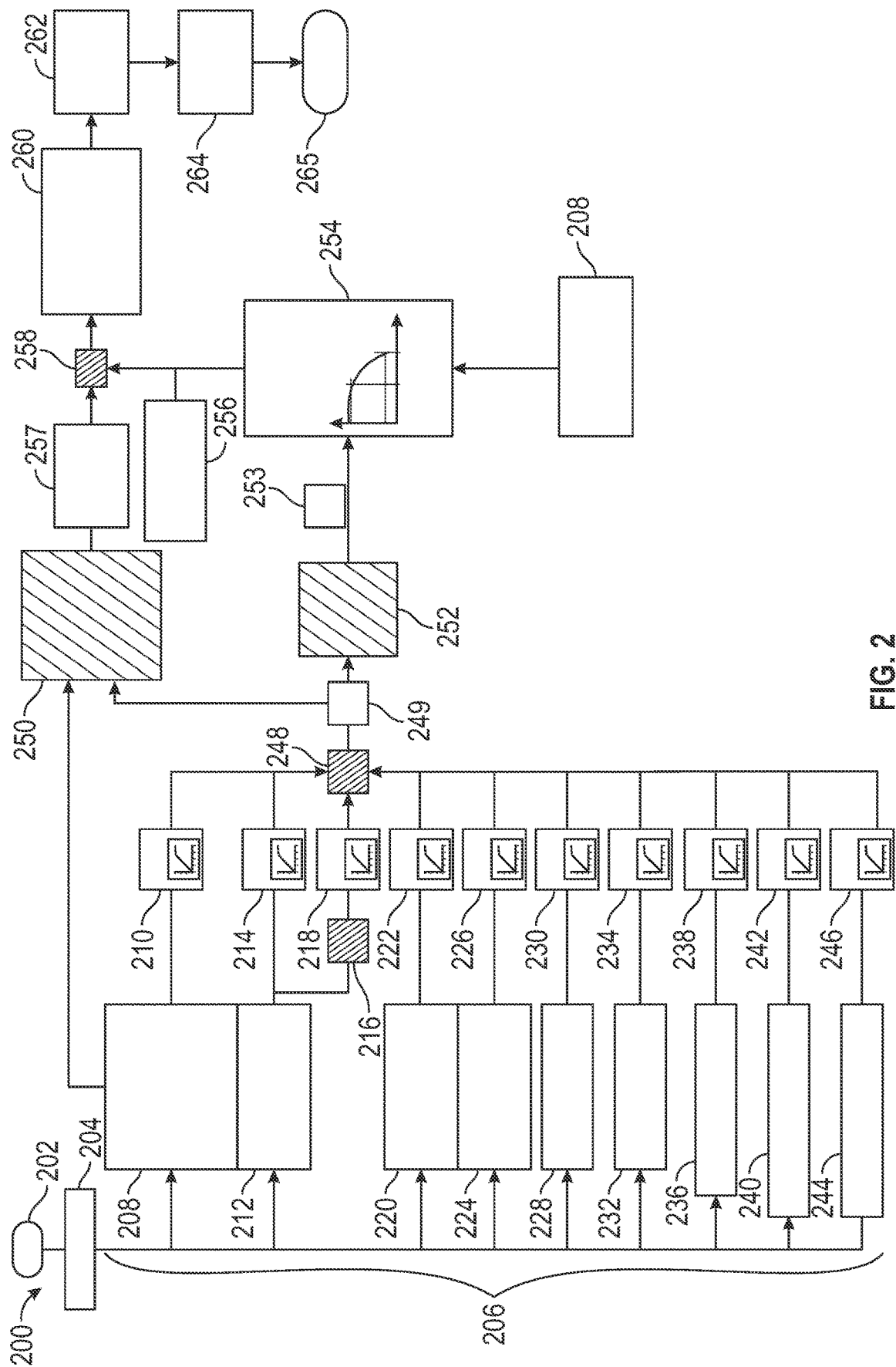
FIG. 2 is a flowchart of process for controlling mitigation of traction steer disturbances in vehicles, and that can be implemented in connection with the vehicle of FIG. 1, including the steering system and the control system of FIG. 1, and components thereof, in accordance with exemplary embodiments.

FIG. 2 is a flowchart of process 200 for controlling mitigation of traction steer disturbances from driver feedback, in accordance with exemplary embodiments. The process 200 can be implemented in connection with the vehicle 100 of FIG. 1, including the steering system 104 and the control system 102 of FIG. 1, and components thereof, in accordance with exemplary embodiments.

As depicted in FIG. 2, the process 200 begins at step 202. In one embodiment, the process 200 begins when the vehicle 100 is or has been operated, for example during or after a current vehicle drive. In one embodiment, the steps of the process 200 are performed continuously once the process 200 begins.

Sensor data is obtained at step 204. In various embodiments, sensor data pertaining to the vehicle is obtained via each of the sensors of the sensor array 130 of FIG. 1. In certain embodiments, the sensor data of step 204 includes the following, among other possible types of sensor data: (i) rack load sensor data from one or more rack load sensors 131 as to a measure a load on the rack system 118 of FIG. 1; (ii) torque sensor data from one or more torque sensors 132, including a propulsion torque for the front axle 114(1) of the vehicle 100; (iii) rotational sensor data from one or more rotation sensors 133, including a rotational speed of one or more front wheels 110 of the vehicle 100; (iv) suspension data from one or more suspension sensors 134 pertaining to a pitch angle of the vehicle 100 and/or one or more other parameters pertaining to a suspension system of the vehicle 100; (v) speed sensor data from one or more speed sensors 135 as to a measure a speed of the vehicle 100 and/or information used to determine the vehicle speed (e.g., wheel speed); (vi) throttle sensor data from one or more throttle sensors 136 as to a position of a throttle of the vehicle 100 (e.g., of the propulsion system 106); (vii) steering wheel angle sensor data from one or more steering wheel sensors 137 as to an angle or angular position of the steering wheel 116; (viii) steering wheel velocity sensor data from one or more steering wheel sensors 137 as to a velocity of the steering wheel 116; and (ix) friction sensor data from one or more friction sensors 138, including as to a road friction coefficient for a road or path on which the vehicle 100 is travelling. In certain embodiments, additional sensor data may also be obtained via one or more input sensors 139, and for example may pertain to inputs provided by a driver of the vehicle 100, such as via a steering wheel, accelerator pedal, brake pedal, and other instruments of the vehicle 100.

In various embodiments, the sensor data of step 204 is translated (e.g., as denoted in FIG. 2 as a combined step 206). Specifically, in various embodiments, during combined step 206, each of the particular types of sensor data (e.g., as reflected in each respective type of sensor data signals) are translated into respective scalar values, as a representation of how likely each type of sensor data (or associated parameter) is likely to contribute to a traction steering condition for the steering wheel 116. In various embodiments, this is performed by a processor (such as the processor 142 of FIG. 1).

Specifically, as part of the combined step 206, in various embodiments: (i) a steering rack load 208 from the rack load sensor data is translated into a rack load scalar 210 (also referred to as $K_{10}$ in FIG. 2); (ii) a front axle propulsion torque 212 from the torque sensor data is translated into a propulsion torque scalar 214 (also referred to as $K_1$ in FIG. 2); (iii) a front axle torque rate of change 216 is calculated from the front axle propulsion torque 212 and is translated into a propulsion torque rate of change scalar 218 (also referred to as $K_2$ in FIG. 2); (iv) a front wheel rotational delta (or change) 220 from the rotational sensor data is translated into a rotational delta scalar 222 (also referred to as $K_3$ in FIG. 2); (v) a vehicle suspension pitch angle 224 from the suspension data is translated into a pitch angle scalar 226 (also referred to as $K_4$ in FIG. 2); (vi) a vehicle speed 228 from the speed sensor data is translated into a vehicle speed scalar 230 (also referred to as $K_5$ in FIG. 2); (vii) a throttle position 232 from the throttle sensor data is translated into a throttle scalar 234 (also referred to as $K_6$ in FIG. 2); (viii) a steering wheel angle 236 from the steering wheel angle sensor data is translated into a steering wheel angle scalar 238 (also referred to as $K_7$ in FIG. 2); (ix) a steering wheel velocity 240 from the steering wheel velocity sensor data is translated into a steering wheel velocity scalar 242 (also referred to as $K_8$ in FIG. 2); and (x) a road friction coefficient 244 from the road friction sensor data is translated into a road friction coefficient scalar 246 (also referred to as $K_9$ in FIG. 2).

In various embodiments, each of the respective scalar values 210, 214, 218, 222, 226, 230, 234, 238, 242, and 246 is based on the current respective corresponding parameter values 208, 212, 216, 220, 224, 228, 232, 236, 240, and 244 in combination with prior or historical data pertaining to such parameter values in relation to traction steer events (e.g., in certain embodiments pertaining to the same vehicle 100 and/or pertaining to other vehicles, such as may be obtained in or from vehicle manufacturer data, published data, shared data between different vehicles, and so on). Also in certain embodiments, the prior or historical data is stored in the memory 144 of FIG. 1 as stored values 154 therein, for example that may include functions, look-up tables, and/or other data representations.

Also in various embodiments, each of the scalar values 210, 214, 218, 222, 226, 230, 234, 238, 242, and 246 has a respective value that is between zero and one. Also in various embodiments, the closer the scalar value is to zero ("0") for a particular parameter, the less likelihood that the particular parameter is contributing to a traction steer disturbance (e.g., with a value of zero meaning that there is certainty or near certainty that a current value of the particular parameter is not causing a traction steer disturbance). Conversely, also in various embodiments, the closer the scalar value is to one ("1") for a particular parameter, the greater is the likelihood that the particular parameter is contributing to a traction steer disturbance (e.g., with a value of one meaning that there is certainty or near certainty that a current value of the particular parameter is causing a traction steer disturbance).

In various embodiments, the respective scalar values are aggregated (step 248). Specifically, in various embodiments, the scalar values 210, 214, 218, 222, 226, 230, 234, 238, 242, and 246 are multiplied together, thereby generating a product 249. In various embodiments, the product 249 may also be referred to as a traction steer likelihood indication (TSLI) 249.

As depicted in FIG. 2, in various embodiments, a traction steer induced rack force estimate is determined (step 250). In various embodiment, during step 250, the traction steer induced rack force represents an amount of rack force that is attributed to a traction steer disturbance. In various embodiments, during step 250, the traction steer induced rack force is determined by a processor (such as the processor 142 of FIG. 1) based on the TSLI 249 along with the rack load 208.

Also in various embodiments, the traction steer induced rack force of step 250 also corresponds to a rack force offset 257 (e.g., that can be utilized to correct or mitigate the traction steer in certain embodiments). In various embodiments, the rack force offset 257 corresponds to a torque that can be applied by the motor 120 to the steering wheel 116 that is equal and opposite to an amount of resistance torque that is coming from the drive torque forces that are creating the rack force, in order to thereby mitigate the traction steer for the steering wheel 116.

In addition, in various embodiments, the TSLI 249 from step 248 is also utilized for cutoff frequency mapping (step 252). Specifically, in various embodiments, when traction steer is deemed to be likely to occur, a cutoff frequency is selected for filtering of the sensor data (particularly the rack load sensor data) that is dependent on the likelihood as to whether traction steer is occurring or about to occur. In various embodiments, this is performed via a processor, such as the processor 142 of FIG. 1. Also in various embodiments, step 252 results in the selection of a particular optimized cutoff frequency "$f_c$" 253 (as depicted in FIG. 2) that is dependent upon the TSLI 249.

In various embodiments, filtering is applied (step 254). Specifically, in various embodiments, during step 254, filtering is applied to the measure values of steering rack load 208 based on the optimized cutoff frequency "$f_c$" 253 of step 252. In various embodiments, the filtering is performed in a manner such that the sensor data (particularly the rack load sensor data) is sufficiently filtered so as to remove any portion of the rack load data that is attributable to force due to drive torque, to thereby also mitigate the traction steer disturbance. In various embodiments, this is performed by a processor, such as the processor 142 of FIG. 1. Also in various embodiments, a variable digital filter is utilized for the cutoff frequency mapping. In certain embodiments, the variable digital filter comprises a first order, low pass filter. In one exemplary embodiment, the variable digital filter comprises a three hertz (3 HZ) low pass filter; however, this may vary in other embodiments. In various embodiments, the filtering of step 254 yields, as an output thereof, a filtered steering rack load 256.

In various embodiments, the rack force offset 257 (from step 250) and the filtered steering rack load 256 (from step 254) are aggregated in step 258. Specifically, in various embodiments, during step 258, the rack force offset 257 and the filtered steering rack load 256 are added together. Also in various embodiments, this is performed via a processor, such as the processor 142 of FIG. 1.

In various embodiments, the summation of step 258 yields, as its calculated result, a traction steering corrected rack load 260. In various embodiments, the traction steering corrected rack load 260 represents a modified or updated rack load value after the removal, from that force value, any forces that are due to traction steer disturbances (e.g., due to propulsion torque and/or related feedback). In various embodiments, this is performed via one or more processor (such as the processor 142 of FIG. 1).

In various embodiments, a resistance adjustment is determined (step 262). Specifically, in various embodiments, during step 262, the traction steering corrected rack load is utilized in determining an appropriate adjustment to be made to the resistance that is provided to the steering wheel 116 of FIG. 1 via the motor 120 of FIG. 1. In various embodiments, the adjustment is determined via a processor (such as the processor 142 of FIG. 1, and/or one or more separate processors, for example of the motor 120 and/or steering system 104 of FIG. 1). Also in various embodiments, the adjustment is determined in a manner such that the resulting adjustment to the resistance on the steering wheel 116 will be equal to, and/or will appear to the driver as being equal to, the resistance on the steering wheel 116 that would have been provided originally in the absence of the traction steer disturbance.

Also in various embodiments, adjusted resistance is provided (step 264). In various embodiments, adjusted resistance is provided for the steering wheel 116 in implementing the determined adjustment of step 264. In various embodiments, the adjusted resistance is automatically implemented via the motor 120 in adjusting resistance to the steering wheel 116 in accordance with and execution of instructions provided to the motor 120 via one or more processors (such as the processor 142 of FIG. 1). Accordingly, in various embodiments, as a result the driver experiences an appropriate level of resistance from the steering wheel 116 based on current operating conditions and parameters pertaining to the vehicle 100 and the roadway, but without the unwanted traction steering disturbance. In other words, in various embodiments, the steering will feel more consistent with what the driver is expecting.

In various embodiments, the process 200 then terminates at step 265.

Accordingly, methods, systems, and vehicles are provided for controlling mitigation of traction steer disturbances for the steering wheel of vehicles. In various embodiments, sensor data is utilized to determine a likelihood that a traction steer disturbance is occurring or about to occur for the steering wheel, and resistance for the steering wheel is adjusted accordingly to mitigate the traction steer disturbances for the steering wheel as experienced by the driver of the vehicle, utilizing a motor that is coupled to the steering wheel and that is controlled in accordance with instructions that are provided by a processor of a control system and that are based on the sensor data.

It will be appreciated that the systems, vehicles, and methods may vary from those depicted in the Figures and described herein. For example, the vehicle 100 of FIG. 1, the control system 102, and steering system 104 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining sensor data from a plurality of sensors of a vehicle having a steering system, including rack load sensor data from one or more rack load sensors, torque sensor data from one or more torque sensors, rotational sensor data from one or more rotation sensors, suspension sensor data from one or more suspension sensors, speed sensor data from one or more speed sensors, throttle sensor data from one or more throttle sensors, steering wheel sensor data from one or more steering wheel sensors, and friction sensor data from one or more friction sensors;
   determining, via one or more processors of the vehicle, a likelihood of a traction steering disturbance occurring for the vehicle, based on each of the rack load sensor data, torque sensor data, rotational sensor data, suspension sensor data, speed sensor data, throttle sensor data, steering wheel sensor data, and friction sensor data; and
   selectively adjusting resistance for a steering wheel of the steering system, in accordance with instructions that are provided via the one or more processors and that are executed via a motor that is coupled to the steering wheel.

2. The method of claim 1, wherein the step of determining the likelihood of a traction steering disturbance occurring comprises:
   generating, via the one or more processors, scalar values for each of a plurality of parameter values from the sensor data, wherein each of the scalar values represents a respective likelihood that a respective one of the plurality of parameter values is likely to contribute to a traction steering disturbance;
   aggregating, via the one or more processors, the scalar values for each of the plurality of parameter values; and
   calculating, via the one or more processors, an aggregate measure as to the likelihood of a traction steering disturbance occurring for the vehicle, based on the aggregating of the scalar values.

3. The method of claim 2, wherein each of the scalar values has a value that is between zero and one.

4. The method of claim 2, wherein the step of aggregating the scalar values comprises multiplying, via the one or more processors, the scalar values for each of the plurality of parameter values.

5. The method of claim 1, further comprising:
   obtaining, from the sensor data, a measured steering rack load for the steering system;
   determining, via the one or more processors, a corrected steering rack load that is attributable to the traction steering disturbance; and
   determining, via the one or more processors, an adjustment to the resistance based on the corrected steering rack load;
   wherein the step of selectively adjusting the resistance comprises implementing the adjustment via the motor that is coupled to the steering wheel in accordance with the instructions that are provided via the one or more processors.

6. The method of claim 5, further comprising:
   determining, via the one or more processors, a traction steer induced rack force estimate, based on the measured steering rack load and the likelihood of a traction steering disturbance occurring for the vehicle;
   wherein the determining of the corrected steering rack load is made using the traction steer induced rack force estimate.

7. The method of claim 6, further comprising:
   applying, via the one or more processors, filtering based on a frequency mapping using the measured steering rack load and the likelihood of a traction steering disturbance occurring for the vehicle;
   wherein the determining of the corrected steering rack load is made using both the traction steer induced rack force estimate and the filtering based on the frequency mapping.

8. A system comprising:
   a plurality of sensors of a vehicle having a steering system, the plurality of sensors configured to obtain sensor data as to the vehicle, the plurality of sensors comprising:
      one or more rack load sensors configured to obtain rack load sensor data;
      one or more torque sensors configured to obtain torque sensor data;
      one or more rotational sensors configured to obtain rotational sensor data;
      one or more suspension sensors configured to obtain suspension sensor data;
      one or more speed sensors configured to obtain speed sensor data;
      one or more throttle sensors configured to obtain throttle sensor data;
      one or more steering wheel sensors configured to obtain steering wheel sensor data; and
      one or more friction sensors configured to obtain friction sensor data; and one or more processors of the vehicle that are coupled to the one or more sensors and that are configured to at least facilitate:
determining a likelihood of a traction steering disturbance occurring for the vehicle, based on each of the rack load sensor data, torque sensor data, rotational sensor data, suspension sensor data, speed sensor data, throttle sensor data, steering wheel sensor data, and friction sensor data; and
selectively adjusting resistance for a steering wheel of the steering system, in accordance with instructions that are provided via the one or more processors and that are executed via a motor that is coupled to the steering wheel.

9. The system of claim 8, wherein the one or more processors are configured to at least facilitate:
generating scalar values for each of a plurality of parameter values from the sensor data, wherein each of the scalar values represents a respective likelihood that a respective one of the plurality of parameter values is likely to contribute to a traction steering disturbance;
aggregating the scalar values for each of the plurality of parameter values; and
calculating an aggregate measure as to the likelihood of a traction steering disturbance occurring for the vehicle, based on the aggregating of the scalar values.

10. The system of claim 9, wherein each of the scalar values has a value that is between zero and one.

11. The system of claim 9, wherein the one or more processors are configured to at least facilitate aggregating the scalar values by multiplying the scalar values for each of the plurality of parameter values.

12. The system of claim 8, wherein the one or more processors are configured to at least facilitate:
obtaining, from the sensor data, a measured steering rack load for the steering system;
determining a corrected steering rack load that is attributable to the traction steering disturbance;
determining an adjustment to the resistance based on the corrected steering rack load; and
selectively adjusting the resistance by implementing the adjustment via the motor that is coupled to the steering wheel in accordance with the instructions that are provided via the one or more processors.

13. The system of claim 12, wherein the one or more processors are configured to at least facilitate:
determining a traction steer induced rack force estimate, based on the measured steering rack load and the likelihood of a traction steering disturbance occurring for the vehicle; and
determining the corrected steering rack load using the traction steer induced rack force estimate.

14. The system of claim 13, wherein the one or more processors are further configured to at least facilitate:
applying filtering based on a frequency mapping using the measured steering rack load and the likelihood of a traction steering disturbance occurring for the vehicle; and
determining the corrected steering rack load using both the traction steer induced rack force estimate and the filtering based on the frequency mapping.

15. A vehicle comprising:
a steering system having a steering wheel and a motor coupled thereto;
a plurality of sensors of a vehicle having a steering system, the plurality of sensors configured to obtain sensor data as to the vehicle, the plurality of sensors comprising:
one or more rack load sensors configured to obtain rack load sensor data;
one or more torque sensors configured to obtain torque sensor data;
one or more rotational sensors configured to obtain rotational sensor data;
one or more suspension sensors configured to obtain suspension sensor data;
one or more speed sensors configured to obtain speed sensor data;
one or more throttle sensors configured to obtain throttle sensor data;
one or more steering wheel sensors configured to obtain steering wheel sensor data; and
one or more friction sensors configured to obtain friction sensor data; and
one or more processors that are coupled to the one or more sensors and that is configured to at least facilitate:
determining a likelihood of a traction steering disturbance occurring for the vehicle, based on each of the rack load sensor data, torque sensor data, rotational sensor data, suspension sensor data, speed sensor data, throttle sensor data, steering wheel sensor data, and friction sensor data; and
selectively adjusting resistance for the steering wheel, in accordance with instructions that are provided via the one or more processors and that are executed via the motor that is coupled to the steering wheel.

16. The vehicle of claim 15, wherein the one or more processors are configured to at least facilitate:
generating scalar values for each of a plurality of parameter values from the sensor data, wherein each of the scalar values represents a respective likelihood that a respective one of the plurality of parameter values is likely to contribute to a traction steering disturbance;
aggregating the scalar values for each of the plurality of parameter values; and
calculating an aggregate measure as to the likelihood of a traction steering disturbance occurring for the vehicle, based on the aggregating of the scalar values.

17. The vehicle of claim 16, wherein:
each of the scalar values has a value that is between zero and one; and
the one or more processors are configured to at least facilitate aggregating the scalar values by multiplying the scalar values for each of the plurality of parameter values.

18. The vehicle of claim 15, wherein the steering system further includes a steering rack, and the one or more processors are configured to at least facilitate:
obtaining, from the sensor data, a measured steering rack load for the steering rack;
determining a corrected steering rack load that is attributable to the traction steering disturbance;
determining an adjustment to the resistance based on the corrected steering rack load; and
selectively adjusting the resistance by implementing the adjustment via the motor that is coupled to the steering wheel in accordance with the instructions that are provided via the one or more processors.

19. The vehicle of claim 18, wherein the one or more processors are configured to at least facilitate:

determining a traction steer induced rack force estimate, based on the measured steering rack load and the likelihood of a traction steering disturbance occurring for the vehicle; and determining the corrected steering rack load using the traction steer induced rack force estimate.

20. The vehicle of claim 19, wherein the one or more processors are further configured to at least facilitate:

applying filtering based on a frequency mapping using the measured steering rack load and the likelihood of a traction steering disturbance occurring for the vehicle; and determining the corrected steering rack load using both the traction steer induced rack force estimate and the filtering based on the frequency mapping.

* * * * *